(12) United States Patent
Wagner et al.

(10) Patent No.: US 7,413,061 B2
(45) Date of Patent: Aug. 19, 2008

(54) METHOD AND DEVICE FOR CONTROLLING AN ELECTRICALLY ACTUATED WEAR ADJUSTER

(75) Inventors: Thomas Wagner, München (DE); Thomas Burkhart, München (DE); Ulf Friesen, München (DE); Manfred Vohla, Wien (AT); Josef Staltmeir, München (DE)

(73) Assignee: Knorr-Bremse Systeme für Schienenfahrzeuge GmbH (DE)

( * ) Notice: Subject to any disclaimer, the term of this patent is extended or adjusted under 35 U.S.C. 154(b) by 330 days.

(21) Appl. No.: 10/509,947

(22) PCT Filed: Mar. 31, 2003

(86) PCT No.: PCT/EP03/03316

§ 371 (c)(1),
(2), (4) Date: Jun. 23, 2005

(87) PCT Pub. No.: WO03/082651

PCT Pub. Date: Oct. 9, 2003

(65) Prior Publication Data

US 2006/0219486 A1   Oct. 5, 2006

(30) Foreign Application Priority Data

Apr. 3, 2002   (DE) ............................... 102 14 669

(51) Int. Cl.
*F16D 55/16*   (2006.01)
(52) U.S. Cl. .............. 188/72.9; 188/1.11 E; 188/1.11 L
(58) Field of Classification Search ............ 188/1.11 L, 188/1.11 E, 72.7–72.9, 156–162, 167, 173
See application file for complete search history.

(56) References Cited

U.S. PATENT DOCUMENTS

| 5,207,299 | A | 5/1993 | Feldmann |
| 5,279,394 | A | 1/1994 | Wollenweber et al. |
| 5,501,305 | A | 3/1996 | Stalmeir et al. ............. 188/167 |
| 6,003,640 | A | 12/1999 | Raela |
| 6,098,760 | A | 8/2000 | Seils |
| 6,119,826 | A | 9/2000 | Niederstadt et al. |
| 6,237,729 | B1 * | 5/2001 | Blattert ....................... 188/158 |
| 6,250,434 | B1 | 6/2001 | Baumgartner et al. |
| 6,279,694 | B1 * | 8/2001 | Bohm et al. ................ 188/162 |

(Continued)

FOREIGN PATENT DOCUMENTS

DE   19835550   2/2000

(Continued)

*Primary Examiner*—Christopher P Schwartz
(74) *Attorney, Agent, or Firm*—Barnes & Thornburg LLP

(57) ABSTRACT

A method and a device for controlling an electrically actuated wear adjuster of a brake application device for vehicles, in particular rail vehicles. Said method comprises the following steps: a) determination of an actual application stroke of brake linings against an allocated brake disc or brake drum during service braking, in accordance with at least one measured brake application path that is traversed by the brake linings and with a measured braking force value that is allocated to said brake application path; b) comparison of the actual application stroke with a desired brake application stroke or a desired application stroke tolerance range and if the actual application stroke deviates from said stroke or range: calculation of an adjustment path from said deviation; c) electronic control of the wear adjuster in accordance with the calculated adjustment path.

20 Claims, 7 Drawing Sheets

U.S. PATENT DOCUMENTS

| | | | |
|---|---|---|---|
| 6,293,370 B1 * | 9/2001 | McCann et al. | 188/71.8 |
| 6,536,562 B1 * | 3/2003 | Bohm et al. | 188/156 |
| 6,554,108 B1 * | 4/2003 | Bohm | 188/1.11 E |
| 6,722,477 B1 * | 4/2004 | Wolfsteiner et al. | 188/72.9 |
| 6,957,571 B2 * | 10/2005 | Staltmeir et al. | 73/121 |
| 6,969,126 B2 * | 11/2005 | Ichinose et al. | 303/11 |
| 7,014,019 B2 * | 3/2006 | Krug et al. | 188/167 |
| 7,055,660 B2 * | 6/2006 | Friesen | 188/265 |
| 7,108,107 B2 * | 9/2006 | Ralea et al. | 188/1.11 L |
| 7,182,184 B2 * | 2/2007 | Baumgartner | 188/156 |
| 7,234,567 B2 * | 6/2007 | Wagner et al. | 188/1.11 E |
| 2004/0074709 A1 * | 4/2004 | Krug et al. | 188/72.1 |

FOREIGN PATENT DOCUMENTS

| | | |
|---|---|---|
| EP | 0699846 | 3/1996 |
| EP | 0995921 A2 | 4/2000 |
| WO | WO 01/21977 A1 | 3/2001 |

\* cited by examiner

METHOD AND DEVICE FOR CONTROLLING AN ELECTRICALLY ACTUATED WEAR ADJUSTER

BACKGROUND AND SUMMARY OF THE DISCLOSURE

The invention relates to a method and a device for controlling an electrically actuated wear adjusting device of a brake application system for vehicles, particularly rail vehicles.

European Patent Document EP 0 699 846 A2 describes a brake application system for rail vehicles, having a caliper-type brake linkage for a disc brake which has, as the screw drive between two brake linkage parts, a mechanically actuated wear adjuster constructed as a thrust rod actuator or as a brake rod actuator. The wear adjuster keeps the brake pad play constant in the event of a wearing of the pad or the brake disc. This takes place by a change of length of the screw drive, in the case of thrust rod actuators, an increasing actuator length causing a reduction of the brake pad play. The drive of the known screw drive takes place mechanically by a brake linkage with a thrust rod which, in the event of an excess stroke of a brake actuator constructed as a pneumatic cylinder—piston driving gear, is operated by a rocker lever. An emergency release of the brake, that is, an emergency-caused braking force reduction of the brake being affected by braking force, takes place by the pneumatic brake actuator. For the auxiliary release of the brake not affected by braking force for maintenance work, for example, for changing the brake pads, the threaded spindle is rotated manually.

The present method and system in one embodiment measured values for the application path, and the assigned braking force values are used as the starting basis for the calculation of the actual application stroke and of the adjusting path that may be required.

The method according to another embodiment is based on a predetermined desired application point in which the brake pad play should be equal to zero. This desired application point is approached and then the wear adjuster, if necessary, is actuated until a measured electric braking force signal is present for the first time and the actual application point has been reached. The covered path between the desired application point and the actual application point of the brake pads will then correspond to the adjusting path. The subsequent restoring of the brake application system into the release position therefore starts out from the actual application point, so that the brake pad play caused by wear will no longer exist for future application movements.

The wear adjuster of all of the embodiments, instead of being mechanically actuated, is electrically actuated. Thus, the known mechanical large-size actuating mechanism is eliminated, which results in a smaller size. In addition, a more precise adjusting of the brake pad play than previously can be achieved. This increases the dynamics of the brake application system.

In the first embodiment, the covered application path of the brake pads during the service braking is directly or indirectly measured on a moved component of the brake application system.

During a service braking taking place with a higher braking force, the brake force value and the respectively assigned covered application path of the brake pads may be measured several times successively. By means of the supporting points obtained therefrom, an essentially linear braking force—application path course can be shown, from which the actual application stroke is mathematically extrapolated. Braking at a higher braking force in this case is a braking during which braking force values of approximately more than 3% to 20% of a maximally possible braking force value occur.

In contrast, during a service braking which took place at a lower braking force, only the braking force value occurring once and the assigned covered application path of the brake pads are used for determining the actual application stroke. Braking at a lower braking force is a braking during which braking force values of approximately less than or equal to 3% to 20% of a maximally possible braking force value occur. At lower braking force values, this method is more precise because no strictly linear braking force—application path relationship is yet present from which the application point could be extrapolated.

The adjusting of the brake pad play may take place in the not-applied condition of the brake application system. A relatively low and cost-effective drive of the wear adjuster will then be sufficient for generating only the braking force required for producing a measurable braking force signal.

The second embodiment is implemented at least during the upgrading or initializing from a emergency-released or auxiliary release position of the brake application system together with a test run.

These and other aspects of the present disclosure will become apparent from the following detailed description of the disclosure, when considered in conjunction with accompanying drawings.

DETAILED DESCRIPTION OF THE DRAWINGS

Figure 1:
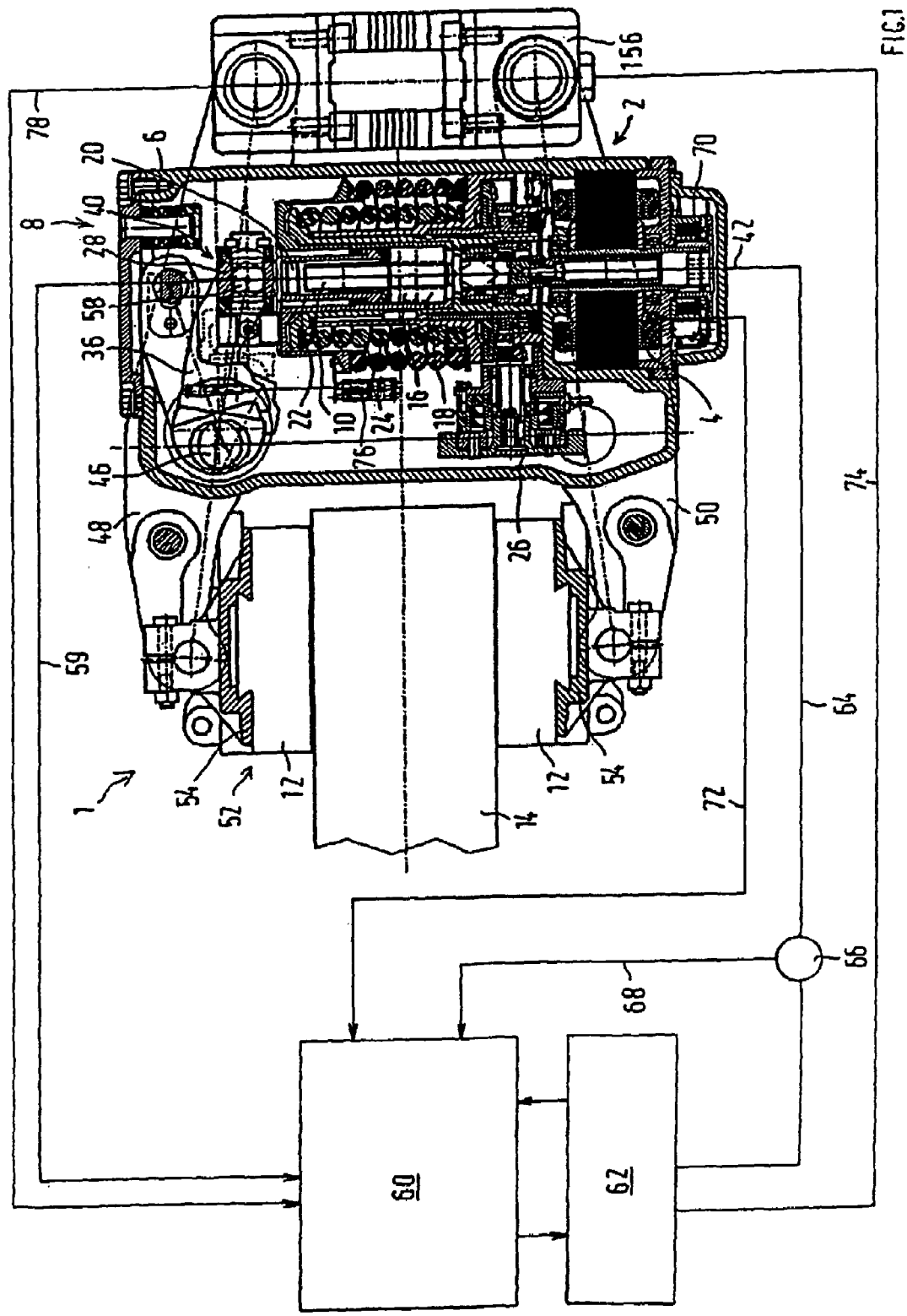
FIG. 1 is a schematic representation of an electromechanical brake application system with an electrically actuated wear adjuster according to the disclosure.

An electromechanical brake application system, which, as a whole, has the reference number 1 in FIG. 1, forms one of several brake application systems of a rail vehicle. The brake application device 1 contains a brake actuator 2 with a service brake unit and an accumulator-type brake unit. The service brake unit has an electric drive, such as an electric servo motor 4, which is accommodated in an actuator housing 6 of the brake actuator 2. A mechanical force converter 8 is used for converting the energy supplied by the brake actuator 2 to a brake application movement.

The servo motor 4 causes a coaxial brake spindle 10 to rotate, which rotations are converted by the force converter 8 to a brake application movement of brake pads 12 in the direction of an axle-mounted brake disc 14, which may also be a brake drum. The force converter 8 comprises, among other components, a nut/spindle constructional unit 16 with a spindle nut 18 which is rotatably disposed on the brake spindle 10 and which, when the brake spindle 10 is rotated, can carry out linear movements in the direction of the spindle axis 42. The end of the brake spindle 10 facing away from the servo motor 4 projects into a cylindrical hollow section of a connecting rod 20 which is non-rotatably and axially fixedly connected with the spindle nut 18. In addition, the cylindrical hollow section of the connecting rod 20 is non-rotatably and axially fixedly held in a sliding sleeve 22, which is acted upon by at least one accumulator-type spring 24 supported on the actuator housing 6. The accumulator-type spring 24 is part of the accumulator-type brake unit and is used as an energy accumulator for storing and releasing energy for the application of the brake as a service-type emergency brake in the sense of an underlying safety level in the event of a failure of the service brake unit and/or as a parking brake. The service brake unit as well as the accumulator-type brake unit act upon the connecting rod 20. In the brake release position, the accumulator-type spring is held in a preloaded position by means of a locking device 26.

The small end 28 of the connecting rod 20 projects out of the sliding sleeve 22 and is linked to a brake lever 36 by a hinge 40 perpendicular to the spindle axis 42. When the brake spindle 10 is driven in the brake application direction or when the locking device 26 of the accumulator-type spring 24 is released, because of the then axially moving-out connecting rod 20, a hinge pin of the hinge 40 is, among others, stressed by shearing forces acting essentially perpendicular to the pin axis.

The other end of the brake lever 36 acts upon an eccentric arrangement having an eccentric shaft 46 which is hinged to a caliper lever 48 which, together with another caliper lever 50, forms a caliper 52. At one set of ends of the caliper levers 48, 50, respective brake pad holders 54 are arranged which have brake pads 12 which are displaceable in the direction of the axis of the axle-mounted brake disc 14. The ends of the caliper levers 48, 50 facing away from the brake pads 12 are connected with one another by a thrust rod actuator 156 which preferably is designed to be electrically actuated. The described arrangement also forms a part of the force converter 8 which converts the moving-out movements of the connecting rod 20 caused by the servo motor 4 or by the accumulator-type spring 24 to a brake application movement of the brake pads 12 in the direction of the brake disc 14.

The hinge pin of the hinge 40 may be a shearing force measuring screw 58. The shearing force measuring screw 58 is equipped with at least one transducer, which is not shown for reasons of scale, for the measuring of quantities from which the braking force acting upon the brake pads 12 can be indirectly or directly derived. The transducer may be strain gauges (DMS) which are fastened to the circumference of the shearing force measuring screw 58, for example, by gluing. They generate signals proportional to the shear deformations of the shearing force measuring screw 58 caused by the shearing forces acting in opposite directions.

Instead of being arranged on the shearing force measuring screw 58 or in addition thereto, one or more strain gauges can also be arranged on the brake lever 36 in order to be able to derive the braking forces from the deformations of the brake lever 36.

A conversion of the shear deformation signals to signals for the actual application force acting in each case upon the brake pads 12 takes place in an electronic analyzing system containing a strain gauge bridge circuit. These signals are transmitted by a signal line 59 to a central control and automatic control unit 60. A deviation between a desired application force and the actual application force is computed there by means of a variance comparison. The desired-value definition for the braking force depends, for example, on the reaching of a demanded desired application force in a time period which is as short as possible.

The control and automatic control device 60 controls a power part 62 which, as a function of the computed deviation, modulates an operating current for the servo motor 4. The operating current is measured by a current sensor 66 connected to an electric line 64 extending between the power part 62 and the servo motor 4. A corresponding motor current signal is fed back by a signal line 68 to the control and automatic control device 60. In addition to being used for controlling a desired application force, the signals for the actual application forces controlled into the control and automatic control device 60 are used as a basis for controlling the thrust rod actuator 156 by an electric line 74. This control will be described later. The signals for the respective motor current are used for monitoring the force adjustment and of the operability of the brake application system 1 during safety-relevant braking. For verifying the measuring results, the motor current measured on the drive side by the current sensor 66 can also be adjusted in the control and automatic control device 60 to the signal for the actual application force.

An angle position encoder 70 arranged at the end of the motor shaft of the servo motor 4 facing away from the brake spindle 10 is used for the indirect measurement of the application path of the brake pads 12 during an actuation of the brake actuator 2. A signal line 72, supplies a corresponding signal to the central control and automatic control device 60 which converts the angle of rotation of the servo motor 4 to the corresponding application path. As an alternative, any type of measuring system could be provided by which the application path of the brake pads 12 can be directly or indirectly measured, for example, an absolute position measuring system. A limit switch 76 detects and reports the release position of the brake actuator 2 to the central control and automatic control device 60.

The brake application system 1 generates load-corrected and/or slip-controlled braking forces. A load-corrected braking force is a braking force essentially adapted to the respective present weight of the rail vehicle. A slip-controlled braking force is a braking force by which the braking takes place with an ideal wheel slip (anti-skid protection control). For this purpose the control and automatic control device 60 has corresponding control operations. Furthermore, the central control and automatic control device 60 has electronic modules for controlling the thrust rod actuator 156 which in FIG. 1 is illustrated only in a top view. The thrust rod actuator 156 is used for the wear adjustment for compensating the wear of the brake pads 12 and of the brake disc 14 occurring during the operation. Instead of a thrust rod actuator 156, a brake rod actuator with a correspondingly adapted power converter 8 may be provided.

Figure 2:
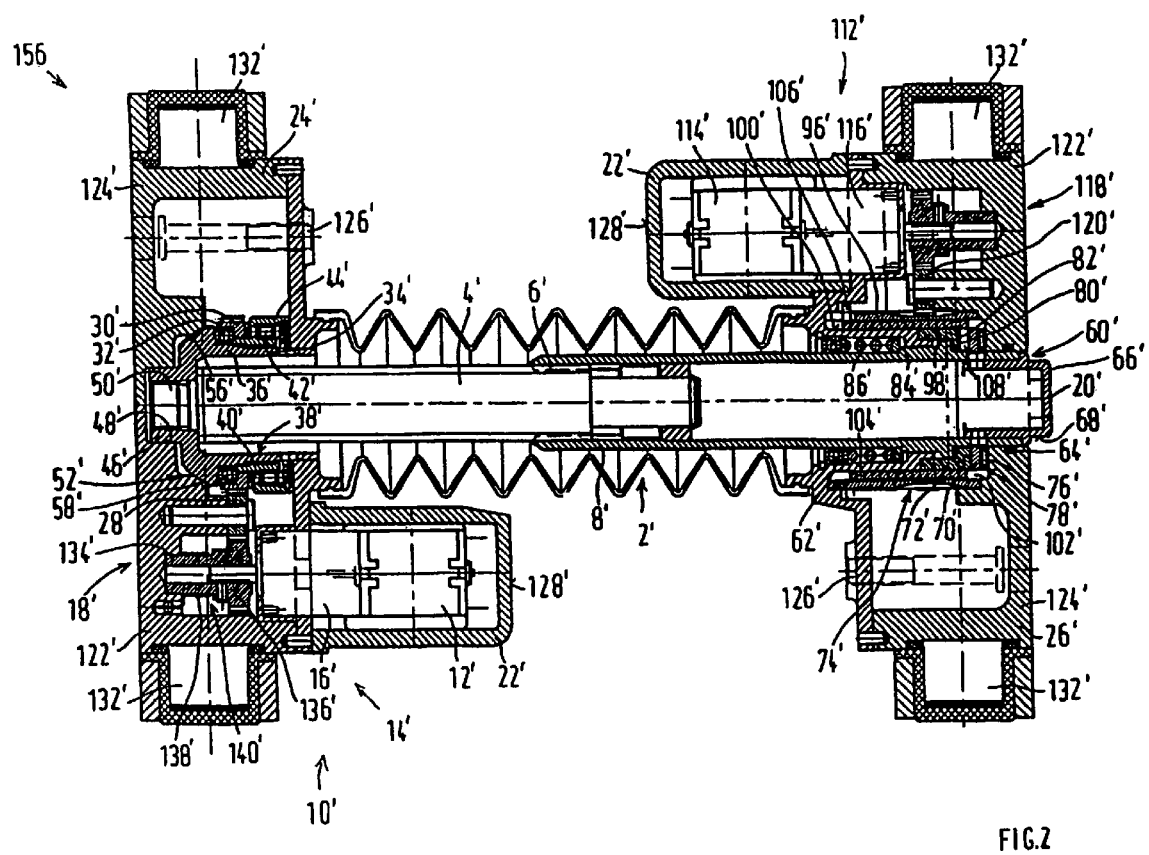
FIG. 2 is a longitudinal sectional view of the wear adjuster of FIG. 1 in a position of the maximal length.

In the view illustrated in FIG. 2, the thrust rod actuator 156 is illustrated in a position of the maximal length. The adjusting path is maximal because a lengthening of the thrust rod actuator 156 by the linking of the caliper levers 48, 50 results in a reduction of the distance of the brake pads 12 from the brake disc 14 and vice-versa.

The thrust rod actuator 156 contains a screw drive 2' which, as the screw parts, has a threaded spindle 4' and a nut 8' which can be screwed onto this threaded spindle 4' by a trapezoidal thread 6' and is constructed as a tube-type part. The trapezoidal thread 6' is not self-locking. For the wear adjustment, the thrust rod actuator 156 is designed to be electrically actuated. An electric drive unit 10' consists of an electric motor 12' with a gearing 14' connected behind it, whose gearing output is rotationally coupled with the spindle 4'. As an alternative, the nut 8' or the spindle 4' and the nut 8' can also be designed to be electrically actuated for adjusting the wear.

The electric motor may be a d.c. motor 12'. The gearing 14' may be a planetary gearing 16' axially adjoining the d.c. motor 12' as well as by a gearwheel stage 18' connected to the output side of the planetary gearing 16'. The d.c. motor 12', the planetary gearing 16' and the gear wheel stage 18' are arranged parallel to and at a radial distance from the center axis 20' of the screw drive 2'. They are housed in a drive housing 22' flanged to a housing part 24', shown on the left in FIG. 1, of the thrust rod actuator 156, to which thrust rod actuator 156 a left caliper lever 50 of the caliper 52 (FIG. 1) is linked. A right housing part 26', as viewed in the axial direction of the screw drive 2', is opposite the left housing part 24'. The right caliper lever 48 of the caliper 52 (FIG. 1) is linked to this right housing part 26'. The spacing of the left housing part 24' and the right housing part 26' of the thrust rod actuator 156 is varied by the screw drive 2' in that, by extending the screw drive 2' or the thrust rod actuator 156, a wear adjustment can take place and the pad play between the brake pads 12 and the brake disc 14, which increases with time, can be reduced again and can be held at a constant value.

Figure 3:
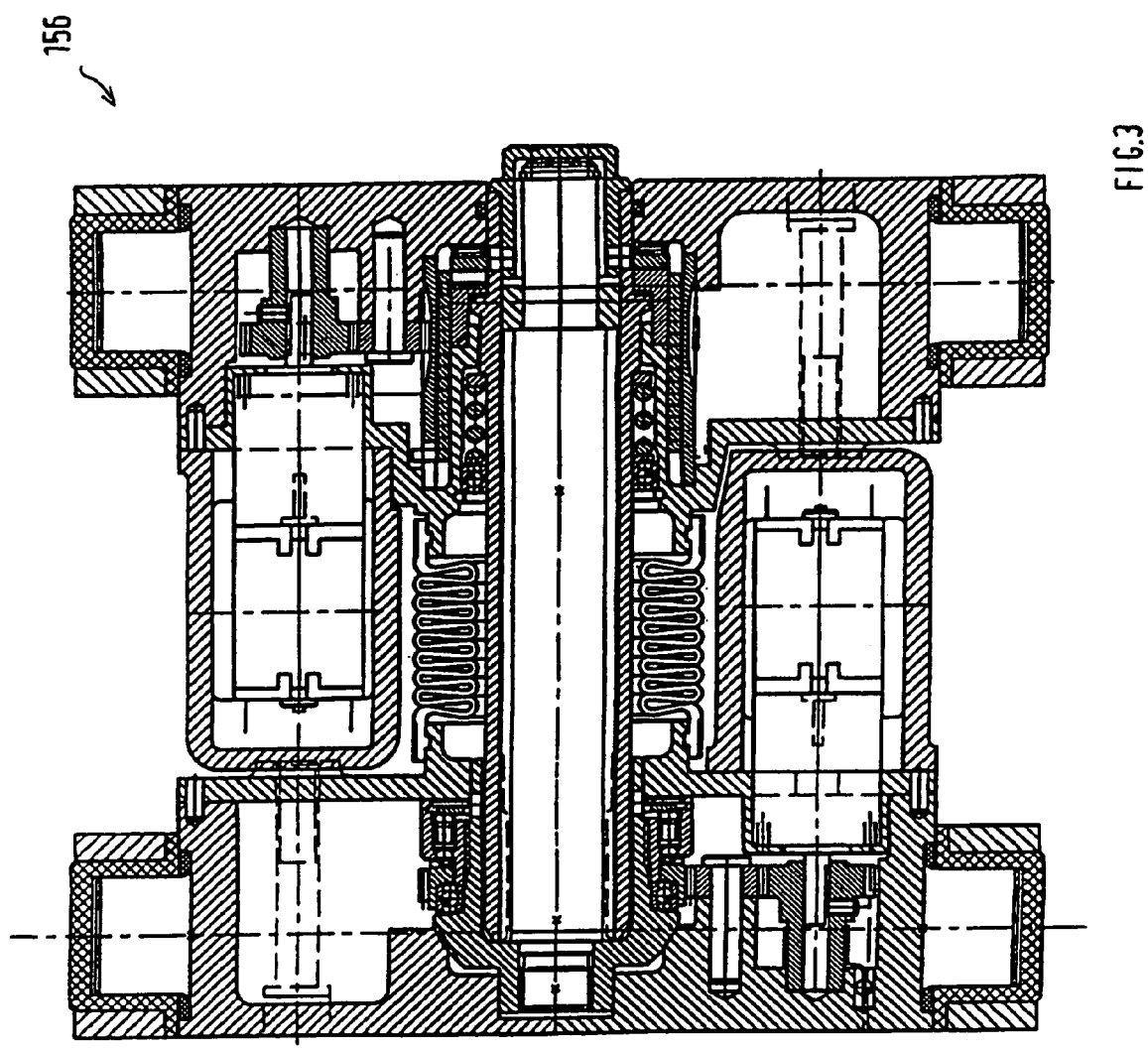
FIG. 3 is a view of the wear adjuster of FIG. 1 in a position of the minimal length.

The gearing-output-side gearwheel 28' of the gearwheel stage 18' meshes with a screw-side gearwheel 30'. Gearwheel 28' is coaxially rotatably disposed on a cylindrical projection 34' of a conical sleeve 36' by a deep-groove ball bearing 32'. A slip clutch 38' arranged on the side of the spindle-side gearwheel 30' pointing to the right housing part 26' couples the electric drive unit 10' with the conical sleeve 36'. The slip clutch 38' contains balls 40', which are pretensioned by a defined spring pressure in grooves constructed on the face of the spindle-side gearwheel 30' and which are guided in bores 42' of a ring 44' non-rotatably held on the cylindrical projection 34' of the conical sleeve 36'. At torques greater than a defined slipping moment, the form closure generated by the balls 40' pressed into the grooves is overcome and the clutch 38' slips, whereby the electric drive unit 10' is uncoupled from the spindle 4'. By the appropriate selection of the spring parameters and of the ball—groove geometry, the slipping moment can be adapted to the momentarily existing requirements. In the present case, the clutch 38' slips when the brake application system reaches stop positions, such as the position in which the brake pads 12 come to rest on the brake disc 14 or the position in which the thrust rod actuator 156 is shortened to the minimal length (FIG. 3) and the spindle 4' is completely screwed into the nut 8'.

The driving torque transmitted by the slip clutch 38' to the ring 44' is introduced into the conical sleeve 36'. A pin-shaped projection 46' on the end of conical sleeve 36' has a radially outer surface, which forms a bearing surface of a slide bearing 48'. The bearing surface is slidably and rotatably disposed in a housing-side bearing surface assigned to it. The slip bearing 48' is used as a bearing point of the spindle 4', which bearing point is on the left side in FIG. 2. The spindle 4', in turn, is screwed by an end-side threaded pin 50' into an internal thread existing in the projection 46' of the conical sleeve 36' and is held there in a non-rotatable manner. As a result, the conical sleeve 36' can transmit the driving torque introduced by the slip clutch 38' to the spindle 4'.

A cone clutch 52' contains at least two conical surfaces 56', 58', which can be stopped by mutual friction against one another and are arranged in an oblique manner viewed in the axial direction. The cone clutch 52' is arranged in front of the electric drive unit 10', one of the conical surfaces 56' being constructed on the left housing part 24' and the other conical surface 58' being constructed on the conical sleeve 36' screwed to the spindle 4'. When the spindle 4' is axially loaded, the two conical surfaces 56', 58' are pressed against one another in the direction of the conical narrowing. Whereby, the respectively taken-up rotating position of the spindle 4' is fixed by frictional engagement or adherence and the axial load is supported by the left housing part 24'. In particular, a transmission of the axial load as a torque to the electric drive unit 10' is prevented. If, in contrast, no axial load is present, the cone clutch 52' is in the released state and the conical sleeve 36', together with the spindle 4', can rotate freely with respect to the left housing part 24'.

The tube-type nut 8' projects into a stepped passage opening 60' of the right housing part 26' and is rotatably disposed there by a deep-groove ball bearing 62' but is axially displaceably disposed with respect to its inner race. A sleeve 66' is non-rotatably and axially fixedly held in the end of the nut 8' which points away from the left housing part 24'. An outer circumference of sleeve 66' rests slidingly on a seal 64' received in the passage opening 60' of the right housing part 26'. The end of the sleeve 66' projecting out of the passage opening 60' is equipped with an application surface 68' for a screwing tool. A slip clutch 70' couples the nut 8' with a coaxial free-wheel sleeve 72' of a lockable free wheel 74'. The lockable free wheel 74' is axially displaceably held on the nut 8' and is supported by a thrust bearing 76' that may be constructed as an axial needle bearing against a radial wall 78' of the right housing part 26'. The nut 8' is therefore disposed in a thrust-bearing type manner.

The slip clutch 70' may be two side face gearings 80', 82' meshing with one another in the axial direction as a result of spring pressure. One side face gearing 80' is constructed on a radially outer ring collar of the end of the nut 8' projecting into the right housing part 26', and the other side face gearing 82' is constructed on the radially inner circumferential surface of the free-wheel sleeve 72'.

A coil spring 86' is supported at one end on the deep-groove ball bearing 62' and at the other end on an outer step 84' of the nut 8'. The nut 8' is pretensioned by the coil spring 86' against the free-wheel sleeve 72', so that the two side face gearings 80', 82' are in a mutual engagement. When a slipping moment is exceeded, the two contrate gearings 80', 82' are disengaged while the nut 8' is axially displaced in the direction of the left housing part 24', whereby the nut 8' can rotate with respect to the free-wheel sleeve 72'. The slipping moment of the slip clutch 70' can be adapted by the suitable selection of the spring parameters and of the side face gearings 80', 82'.

In the right housing part 26', an electric drive unit 112' is accommodated for the emergency release and the auxiliary release of the brake application system. "Emergency release" is a braking force reduction of the brake application system 1 acted upon by braking force, for example, in the event of a failure of the brake actuator 2, and "auxiliary release" is a release of the brake not acted upon by braking force for maintenance work, for example, for changing the brake pads.

The electric drive unit 112' consists of an electric motor, for example, a d.c. motor 114', of a planetary gearing 116' as well as of a gearwheel stage 118', so that the two electric drive units 10', 112' may have an identical construction. The gearing-output-side gearwheel 120' of the gearwheel stage 118' meshes with a toothed sleeve 96' which is coaxial with the screw drive 2'. The toothed sleeve 96' is rotatably accommodated in the right housing part 26' and is radially spaced by an annulus 102' with respect to a housing surface 100' which is flush with the radially outer circumferential surface 98' of the free-wheel sleeve 72' and axially adjoins the circumferential surface 98' of the free-wheel sleeve 72'. A coil spring 104' which is coaxial with respect to the center axis 20' of the screw drive 2' and has two pin-type ends 106', 108' bent away oppositely in the radial direction is accommodated in the annulus 102'. One end 106' is form-lockingly held in a radial passage bore of the toothed sleeve 96', and the other end 108' is form-lockingly held in a radial passage bore of the free-wheel sleeve 72'.

The toothed sleeve 96', the coil spring 104', the free-wheel sleeve 72' and the housing surface 100' together form a lockable free wheel as a coil spring free wheel 74', which couples the electric drive unit 112' with the nut 8'. More precisely, the coil spring free wheel 74' rotates the nut 8' by the electric drive unit 112' in a direction against the wear adjustment and locks this rotation when the rotation of the nut 8' is not caused by the electric drive unit 112'. The above-described slip clutch 70' is arranged between the nut 8' and the coil spring free wheel 74'.

Relative to an imagined point of intersection of the center axis 20' of the screw drive 2' and an imagined vertical center line of the thrust rod actuator 156, the two electric drive units 10', 112' are arranged essentially point-symmetrically with respect to one another. Also, they point toward one another starting from the end of the spindle 4' or of the nut 8'. More precisely, the drive unit 10' for the wear adjustment projects essentially from the drive-side end of the spindle 4' in the direction of the drive unit 112' for the emergency and auxiliary release, and the drive unit 112' projects essentially from the drive-side end of the nut 8' in the direction of the drive unit 10' for the wear adjustment. Both drive units 10', 112' actuate a single screw drive 2' for the combined wear adjustment and emergency or auxiliary release.

The right and the left housing part 24', 26' each consists of housing sections 122', 124' which are essentially symmetrical relative to the center axis 20' of the screw drive 2'. The drive units 10', 112' are each accommodated in a separate housing section 122'. A final position sensor 126' is accommodated in the housing section 124' arranged on the opposite sides of the center axis 20. The final position sensor 126 is situated opposite a face-side surface 128' of the drive housing 22' of the respectively other electric drive unit 10', 112'. The final position sensors may be mechanical final position switches 126'. They are each actuated by engaging the face-side surface 128' of the drive housing 22' of the opposite drive unit 10', 112'. The actuation switches 126' supply a signal to the central control and automatic control unit 60 (FIG. 1) when reaching the position illustrated in FIG. 3, in which the thrust rod actuator 156 has moved to the minimal length. Whereupon, the respectively actuated drive unit 10', 112' is de-energized. At their ends pointing away from one another, the two housing sections 122', 124' of each housing part 24', 26' are in each case provided with one receiving device 132' for bolts, by which one caliper lever 48, 50 respectively of the caliper 52 is linked to each housing part 24', 26'.

Furthermore, a coil spring 138' of another coil spring free wheel 140' is arranged on a cylindrical projection 134' of the planetary-gearing-side gearwheel 136' of the gearwheel stage 18' assigned to the drive unit 10' for the wear adjustment. This coil spring free wheel 140' blocks a rotation of the gearwheel 136' in the direction against the wear adjustment and permits it to run freely in the opposite rotating direction.

As a result of the described construction of the thrust rod actuator 156, and specifically a single screw drive 2', with one screw part respectively is coupled with a separate drive unit; the brake pad wear can be corrected, and the brake can be released for emergencies and/or in an auxiliary manner. Specifically, the spindle 4' is coupled with one electric drive unit 10', and the nut 8' is coupled with the other electric drive unit 112'.

Based on this background, the method of operation of the thrust rod actuator 156 is as follows:

The wear adjustment, that is, the reduction of the brake pad play, which exists between the brake pads 12 and the brake disc 14 and which has become too large as a result of wear, preferably takes place in the brake-force-free brake release position. For this purpose, the d.c. motor 12' of the electric drive unit 10' provided for the wear adjustment is controlled for a predetermined time and causes the spindle 4' to rotate in one rotating direction by the slip clutch 38' closed in the case of a driving torque which is smaller than the slipping moment. During the rotating movement, the spindle 4' is screwed out of the nut 8' and the thrust rod actuator 156 is thereby lengthened, which results in a reduction of the brake pad play. FIG. 2 shows the thrust rod actuator 156 in a position of its maximal length. Since the screw drive 2' is thereby loaded by only very low axial forces, the cone clutch 52' is in the released position, so that the spindle 4' can rotate freely. The nut-side coil spring free wheel 74' blocks a rotating-along of the nut 8', which is not secured against a rotation per se, because a rotation of the nut 8' is transmitted by the slip clutch 70' to the free-wheel sleeve 72' and from there to the coil spring 104' which then pulls tight and establishes a frictionally engaged connection between the free-wheel sleeve 72' and the housing surface 100'. Thus the nut 8' is non-rotatably supported on the right housing part 26'.

During a braking, the bearing pressure force resulting from the braking force existing at the brake pads and transmitted by the hinged caliper levers 48, 50 of the caliper 52 to the thrust rod actuator 156 and acting there in the axial direction could not be supported on the screw drive 2' because the trapezoidal thread 6' between the spindle 4' and the nut 8' does not have a self-locking construction. As a result, the thrust rod actuator 156 would be shortened under the influence of the axial pressure force and causes an undesirable loss of braking force. However, the cone clutch 52' closes under the effect of the axial load by the pressing-together of the mutually assigned conical surfaces 56', 58' in a frictionally engaged manner and establishes a non-rotatable connection between the spindle 4' and the left housing part 24'. On the other hand, the nut-side slip clutch 70' constructed as a side face gearing 80', 82' remains closed under the axial load and transmits the moment of reaction to the coil spring 104' which then pulls tight and supports the moment of reaction at the right housing part 26'. As a result, there is no shortening of the thrust rod actuator 156 and thus no unintended loss of braking force can occur during a braking operation.

If a fault occurs, in the case of a brake actuator 2 illustrated in FIG. 1 or in its control, which has the result that the brake actuator can no longer release the brake acted upon by the braking force, this brake has to be subjected to an emergency release. For the emergency release of the brake, the electric drive unit 112' is preferably controlled for the emergency and/or auxiliary release from an engineer's cab of the urban railroad or subway by the control and automatic control unit. Specifically, coil spring 104' rotates in a direction in which the coil spring 104' expands. As a result, the previously existing frictional engagement between the free-wheel sleeve 72' and the housing surface 100' is eliminated. Thus the nut 8' has a free run in this rotating direction. The coil spring 104' can therefore transmit the rotating movement introduced into it by the toothed sleeve 96' to the free-wheel sleeve 72'. This rotation is transmitted to the now freely running nut 8' by the slip clutch 70' which is closed because it is not overloaded. As a result, the thrust rod actuator 156 is shortened and the braking force is reduced. The thrust rod actuator 156 can thereby be shortened to the minimal length illustrated in FIG. 3 in which the nut 8' on the face side comes in contact with the bottom of the conical sleeve 36' and the final position switches 126' are actuated, a corresponding signal being transmitted to the central control and automatic control unit 60.

If, for maintenance work, the brake is to be moved into a position in which the brake pads 12 are at a maximal distance from the brake disc, for example, for exchanging the brake pads 12, the auxiliary release of the brake can also take place by the electric drive unit 112' for the emergency release in the manner described above. The torque is limited which can be transmitted by means of the nut-side wrap spring 104' expanded by the driving torque and is subjected to a bending stress, in the cases in which the screw drive 2' is stiff, for example, because of icing. In this case, the nut 8' is rotated directly for shortening the thrust rod actuator 156. This takes place in the braking-force-free state by applying a screwing tool to the application surface 68' of the sleeve 66' non-rotatably connected with the nut 8'. The nut 8' is manually rotated in a direction in which the thrust rod actuator 156 is shortened to the minimal length illustrated in FIG. 3. The torque must be so large that the slip clutch 70' arranged between the free-wheel sleeve 72' and the nut 8' can slip, while the coil spring 104' of the coil spring free wheel 74' blocks the free-wheel sleeve 72' in this direction. In this case, the nut 8' is displaced sufficiently away from the free-wheel sleeve 72' in the axial direction that the two side face gearings 80, 82 are disengaged.

Figure 4:
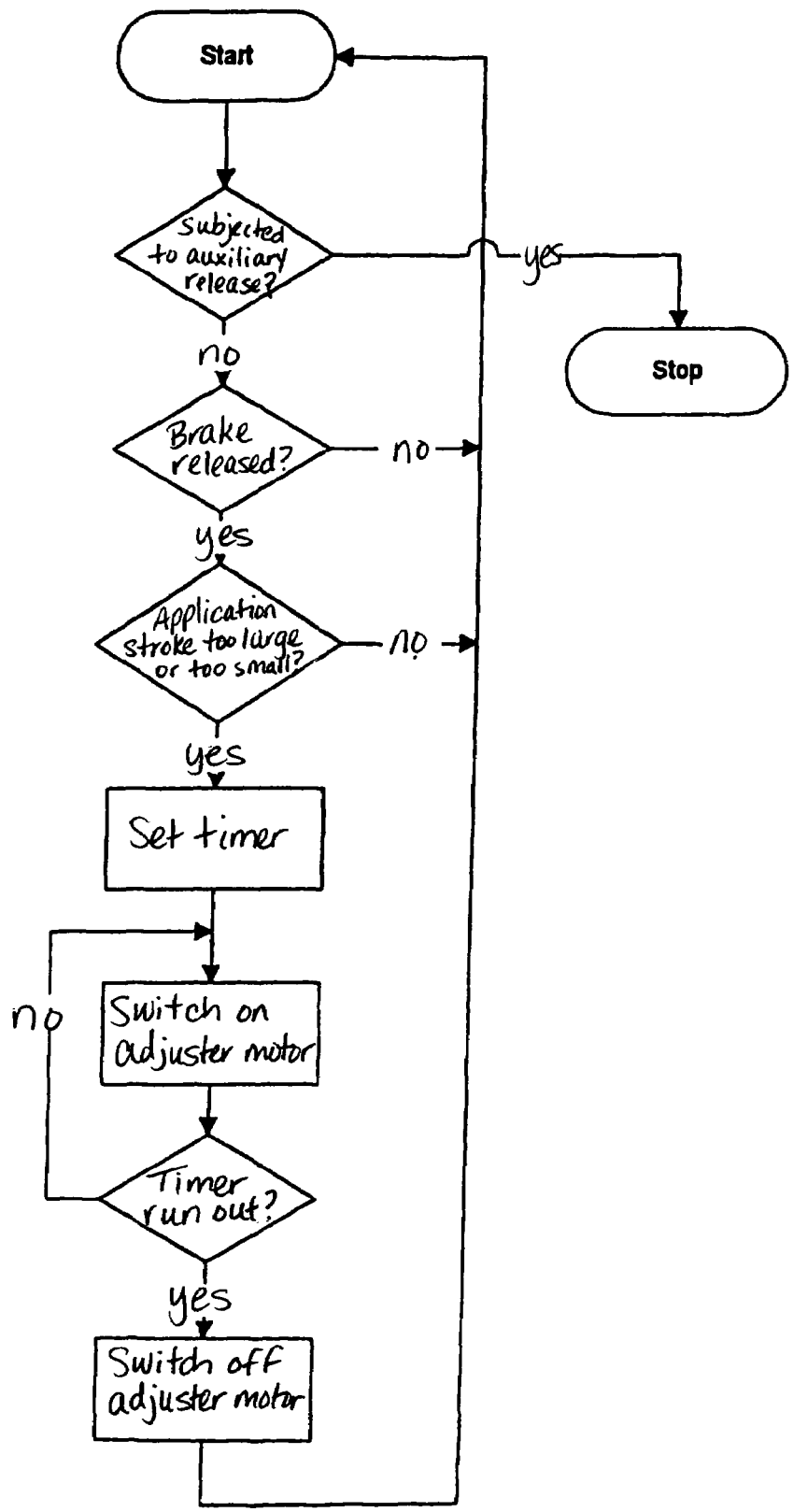
FIG. 4 is a program flow chart of a wear adjusting operation by the wear adjuster of FIG. 2.

In order to adjust a desired brake pad play between the brake pads 12 and the brake disc 14 within the scope of the above-described wear adjusting, the thrust rod actuator 156 is controlled as follows by the central control and automatic control unit 60 according to the program flow chart illustrated in FIG. 4:

First, by the presence or absence of signals of the limit switches 126', it is determined whether the brake application system 1 is in an emergency-released position or in a position released in an auxiliary manner, which is illustrated in FIG. 4 by the branching "released in an auxiliary manner?". If it is released in an auxiliary manner, the program is stopped. If it is not, the query "brake released?" takes place because the wear adjustment preferably is to take place only in the released position or in the not-applied condition of the brake. When the brake is released, in which case the limit switch 76 generates a corresponding signal, the program is continued with the next program step. A not-released brake therefore causes a return to the program start.

Figure 5:
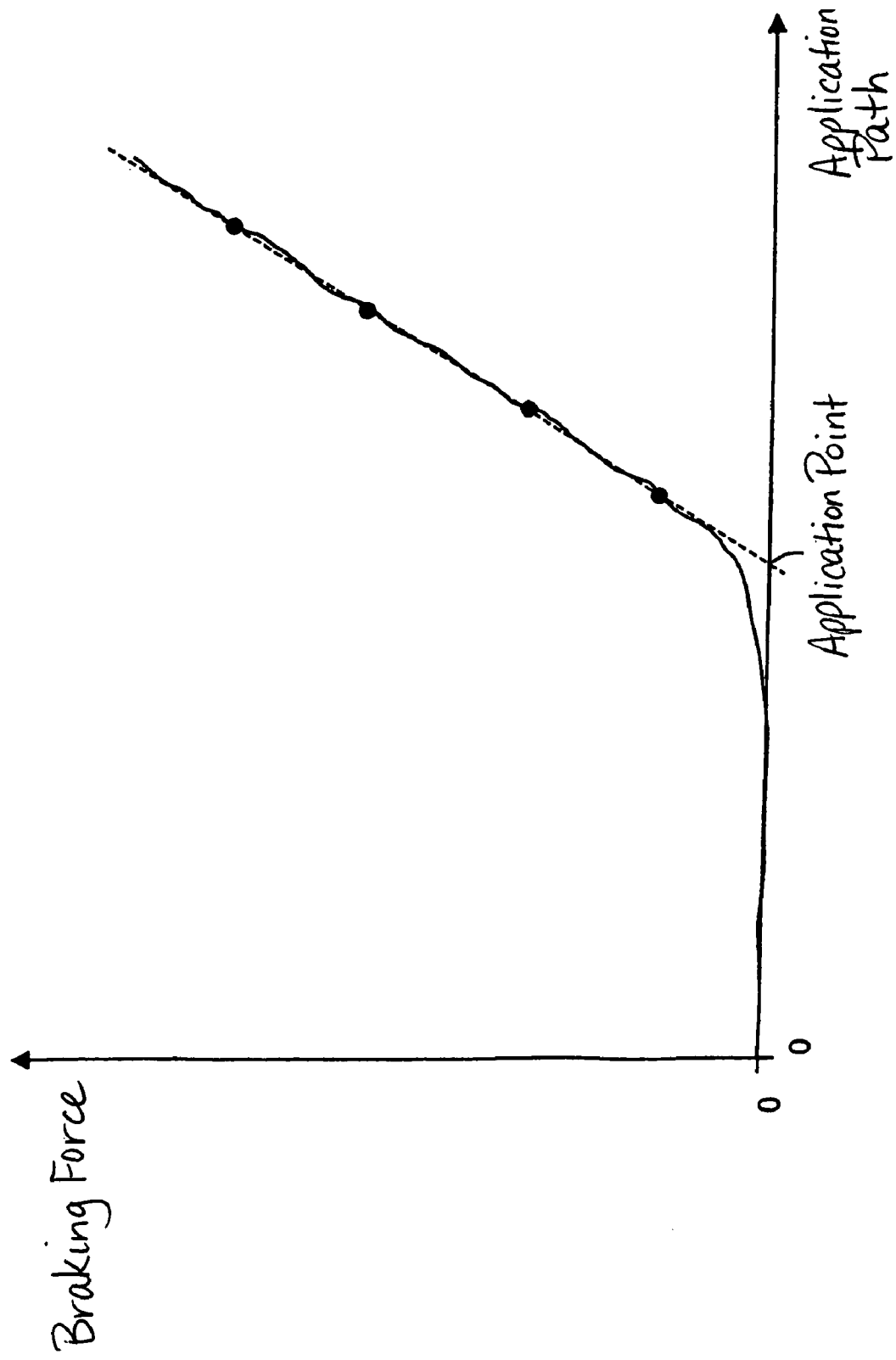
FIG. 5 is a view of a typical characteristic braking force—application path curve of the brake adjuster of FIG. 1.

Previously, the actual application stroke of the brake pads 12 to the brake disc 14 during a preceding service braking was determined in that the application path traveled by the brake pads 12 and a braking force value assigned to this application path was measured. The angle encoder 70, which measures the rotating angle of the servo motor 4 during the service braking and provides a corresponding signal to the control and automatic control device 60, is used for measuring the application path. For example, in the present arrangement, 1 mm of application path corresponds to approximately 6 mm of spindle path or 3 revolutions of the servo motor 4. The control and automatic control unit 60 also receives the force signal assigned to the measured application path from the shearing-force measuring screw 58 provided with a strain gauge. From the two measured values—the application path and the braking force value assigned to the latter—preferably as a function of the amount of the braking force value, the actual application stroke is computed as follows:

During a service braking taking place at a higher braking force, the braking force value and the respectively assigned covered application path of the brake pads 12 are measured several times successively in order to provide supporting points from which the control and automatic control unit 60 computes a theoretical linear characteristic braking force—application path curve which is illustrated in FIG. 5 as a straight line indicated by interrupted lines. The actual course indicated by a solid line in FIG. 5 is congruent for higher braking forces with the theoretical straight line. In this case, braking at a higher braking force is braking during which braking force values occur of preferably approximately more than 3% to 20% of a maximally possible braking force value. By means of extrapolation, the theoretical and linear characteristic braking force—application path curve is continued to very small braking force values to a computed point of intersection with the abscissa which corresponds to the application point of the brake pads 12 on the brake disc 14. This application point is characterized in that, after the contact stroke of the brake pads 12 onto the brake disc 14 has taken place, a braking force value can be detected for the first time by the shearing-force measuring screw 58. The actual application stroke of the brake pads 12 is then obtained from the abscissa value of this application point by the corresponding computation by the control and automatic control device 60.

As illustrated in FIG. 5, the course of the actual characteristic braking force—application path curve is not linear at low braking forces, so that, in this range, an extrapolation with sufficient precision is difficult. Braking at a low braking force is a braking during which braking force values occur of approximately less than or equal to 3% to 20% of a maximally possible braking force value. During such a braking, preferably only the braking force value occurring for the first time and the assigned covered application path of the brake pads are used for determining the actual application stroke. This means that, when the shearing-force measuring screw 58 as the braking force sensor responds for the first time, the application path covered so far is stored and a calculation of the actual application stroke takes place therefrom.

The control and automatic control unit 60 compares the determined actual application stroke with a defined desired application stroke or a desired application stroke tolerance range, which is illustrated in FIG. 4 by the branching "application stroke too large or too small?". If the actual application stroke deviates from the desired application stroke or from the desired-application-stroke tolerance range, the required adjusting path is calculated from the difference of these values, and if not, the program returns to the program start. Subsequently, the drive unit 10' is controlled for the wear adjustment of the thrust rod actuator 156 as a function of the calculated adjusting path. This can take place, for example, in that the drive unit 10' is actuated for a time which depends on the calculated adjusting path, which in FIG. 4 is indicated by the "set timer" operation. The time—adjusting path relationship is known from the quantities rotational speed of the d.c. motor 12' and the transmission ratio of the gearing 14' stored in a memory of the control and automatic control unit 60. If the actuating time assigned to the required adjusting path has expired, which is queried by the branching "has timer run out?", the drive unit 10' is deactivated and the program returns to the start.

According to an alternative approach, the brake application system 1 is first actuated by energizing the actuator motor 4 until the brake pads 12 have reached a position which corresponds to a defined desired application point. When wear is present, this desired application point of the brake pads 12 deviates from the actual application point, when the brake pads moved into the desired application point still have a clear distance from the brake disc 14 which corresponds precisely to the wear to be adjusted. Subsequently, the drive unit 10' is activated for the wear adjustment until the shearing force measuring screw 58 detects a braking force signal for the first time, whereby precisely the wear path is compensated. Finally, the brake actuator 2 is restored into the release position.

Figure 6:
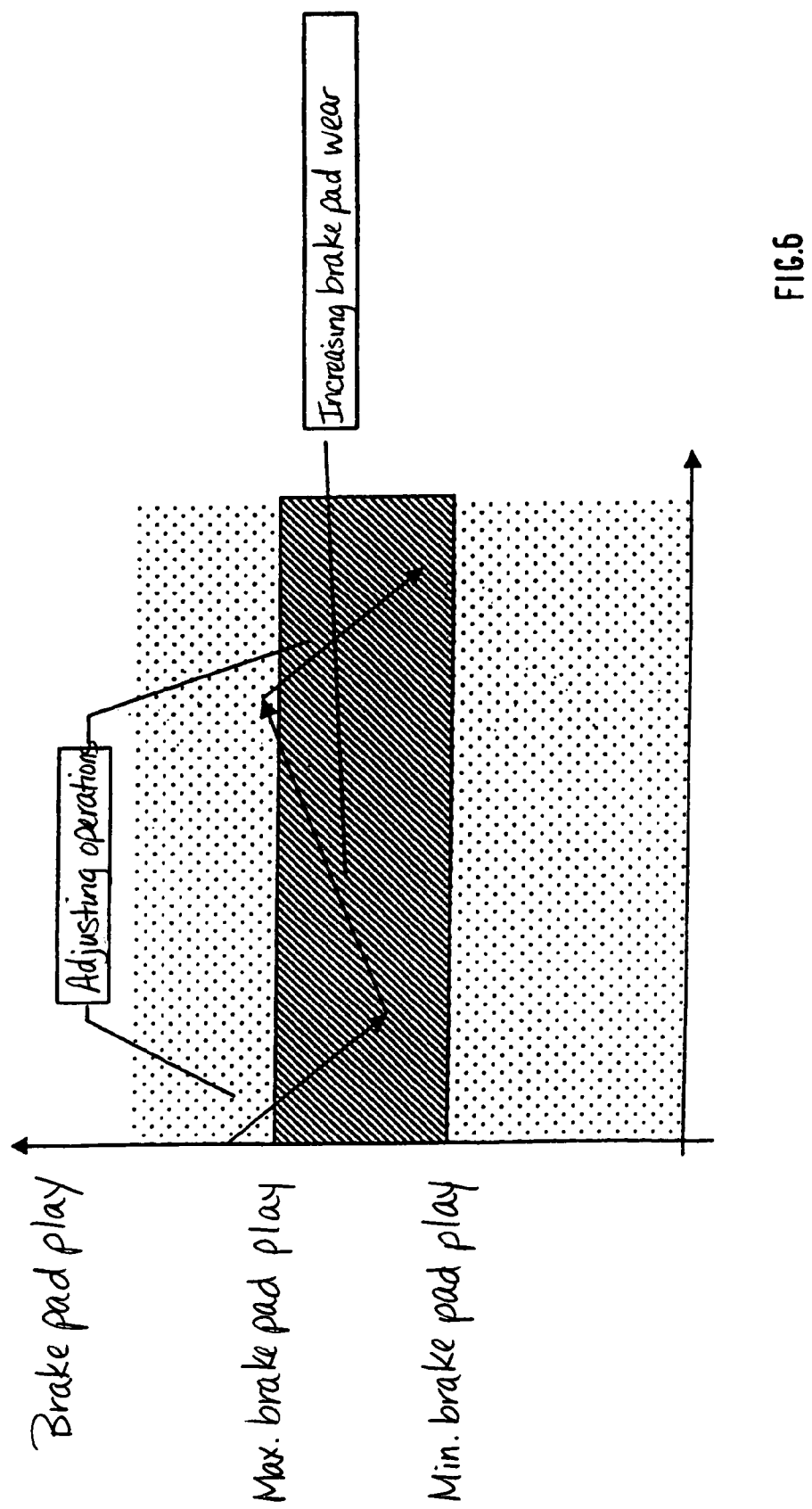
FIG. 6 is a brake pad play—time diagram.

The permissible brake pad play or the permissible wear can be permitted within a certain tolerance, as illustrated by FIG. 6, which shows the tolerance range between a maximally permissible brake pad play and a minimally permissible brake pad play by shaded lines. Adjusting operations therefore will only take place in the event that the actual wear or the actual brake pad play is either above the maximally permissible brake pad play or below the minimally permissible brake pad play. In the example according to FIG. 6 illustrated by the arrows, the wear at the time t=0 is above the maximally permissible brake pad play, so that the adjusting takes place as described above. As the time t increases, that is, with a rising number of service brakings, the wear will necessarily also increase. When the wear then again exceeds the maximally permissible brake pad play, another adjustment takes place. The described change between the wear development and the adjusting operation will then be repeated until the brake pads 12 and the brake disc 14 respectively have arrived at the wear limit and have to be exchanged. The case may then occur that the brake pad play is too small, so that the adjustment takes place in the opposite direction, for example, by the inverse drive of the drive unit 10'.

Figure 7:
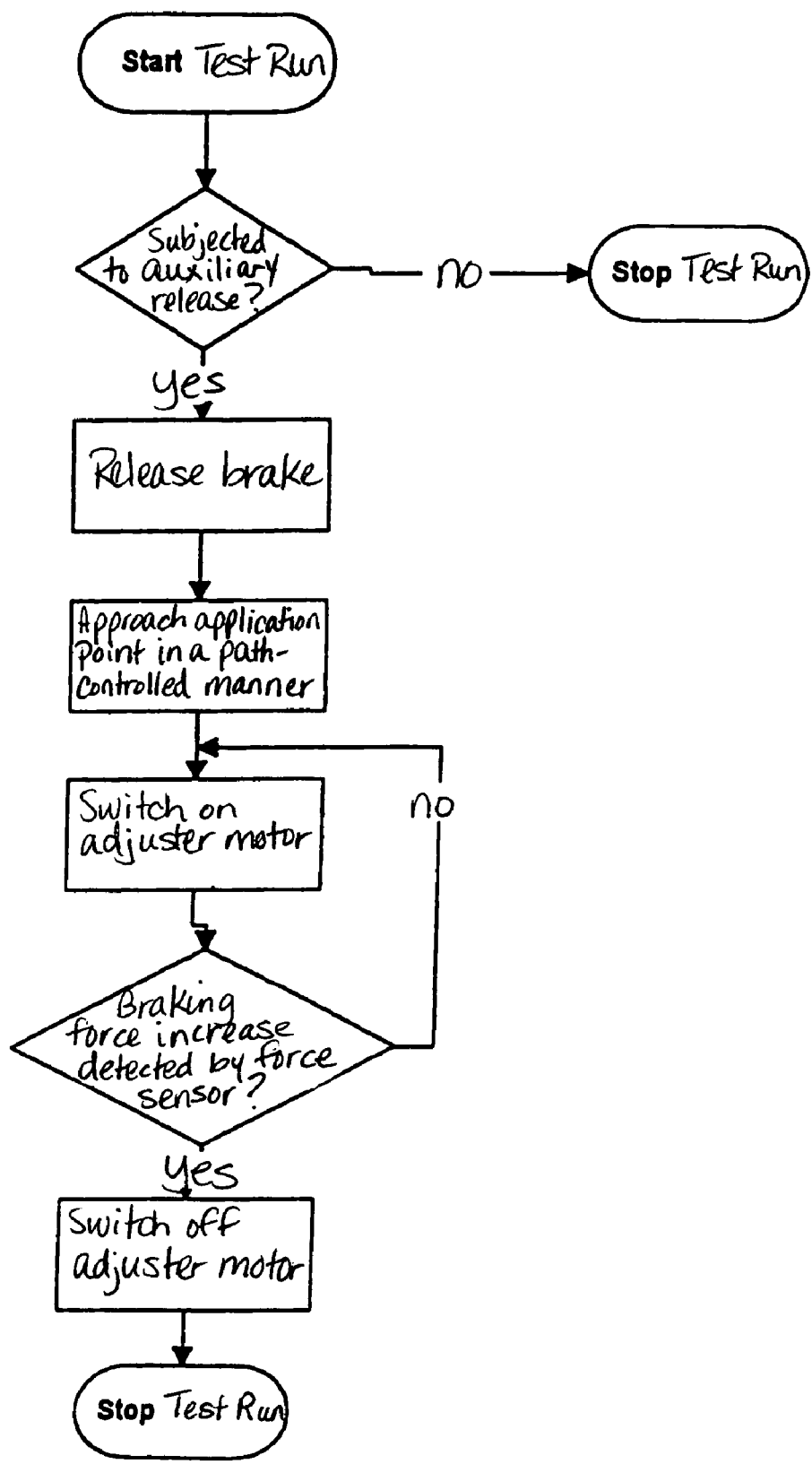
FIG. 7 is a program flow chart of a test run program for the brake application system of FIG. 1.

A brake which has been subjected to an emergency release or an auxiliary release, for example, after a brake pad exchange, is detected by an operation of the limit switches 126' (FIG. 2). A wear adjusting operation takes place during each initialization of the brake at the start of the operation after an emergency release or auxiliary release operation and particularly during a test run taking place within the scope of the initialization, whose faultless pass is a prerequisite for the subsequent operation of the brake. FIG. 7 is a program flow chart of the test run. First, it is determined at the branching "has auxiliary release taken place" whether the brake actuator 2 is in a condition in which it was emergency-released or subjected to an auxiliary release, which is detected by the presence or absence of a signal of the limit switch 126'. If it was not subjected to an auxiliary or emergency release, the first program is stopped. When the brake is subjected to an auxiliary or emergency release, the brake actuator 2 is released according to the subsequent operation "release brake" by the actuating of the servo motor 4, in order to obtain by the resulting actuation of the limit switch 76, a reference for the subsequent application path measurement. Subsequently, as in the above-described alternative approach, the brake application system 1 is first actuated by the energizing of the servo motor 4, until the brake pads 12 have reached a position which corresponds to a defined desired application point. This operation is illustrated in FIG. 7 by the operation symbol "approach application point in a path-controlled manner". Subsequently, the drive unit 10' for the wear adjusting according to the operation "switch on adjuster motor" is activated until the shearing force screw 58 detects a braking force signal for the first time, as indicated by the branching "braking force rise detected by the force sensor?", whereby precisely the wear path is compensated. Finally, the drive unit 10' is deactivated, and the brake actuator 2 is reset in the release position.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A method of controlling an electrically actuated wear adjusting device of a brake application system for vehicles, particularly for rail vehicles, comprising:
    a) determining an actual application stroke of brake pads from a release position to an application point onto an assigned brake disc or brake drum during a service braking having a covered application path from release to a service braking position as a function of a measured braking force value assigned to this covered application path,
    b) comparing the actual application stroke with a desired application or a desired-application stroke tolerance range and, if the actual application stroke deviates therefrom, computing an adjusting path from the deviation, and
    c) electronically controlling the wear adjusting device as a function of the computed adjusting path to reestablish the desired application stroke or tolerance range.

2. The method according to claim 1, wherein the covered application path of the brake pads during the service braking is measured directly or indirectly on a moved component of the brake application system.

3. The method according to claim 2, wherein, during a service braking which took place at a lower braking force, only the braking force value which occurred for the first time and the assigned covered application path of the brake pads are used for determining the actual application stroke.

4. The method according to claim 3, wherein brakings at a lower braking force are brakings at which braking force values occur of approximately lower than or equal to 3% to 20% of a maximally possible braking force value.

5. The method according to claim 2, wherein, during a service braking which took place at a higher braking force, the braking force value and the respectively assigned covered application path of the brake pads are measured several times successively for determining a braking-force application path course, from which the actual application stroke is extrapolated.

6. The method according to claim 5, wherein brakings at a higher braking force are brakings at which braking force values occur of approximately more than 3% to 20% of a maximally possible braking force value.

7. The method according to claim 1, wherein the wear adjuster for the wear adjusting is actuated for a time depending on the adjusting path.

8. The method according to claim 1, wherein the adjusting of the brake pad play takes place in the released or not applied condition of the brake application system.

9. A method of controlling an electrically actuated wear adjusting device of a brake application system for vehicles, particularly for rail vehicles, comprising:
    a) operating the brake application system until the brake pads have reached a defined desired application point or a desired application point tolerance range,
    b) electrically actuating the wear adjusting device until a measured electric braking force signal is present for the first time, and
    c) restoring the brake application system to a release position from the position the of step b.

10. The method according to claim 9, wherein it is implemented at least for the upgrading or initialization from a position of the brake application system subjected to an emergency release or an auxiliary release, together with a test run.

11. A device for controlling an electrically actuated wear adjusting device of a brake application system for vehicles, particularly for rail vehicles, comprising:

a) sensors for measuring at least an application path from a release position to a service braking application position covered by brake pads and a braking force value assigned to this application path during a service braking and for generating corresponding output signals, b) means for determining an actual application stroke from the release position to an application point of the brake pads to an assigned brake disc or brake drum as a function of the output signals, c) means for comparing the actual application stroke with a desired application stroke or a desired application stroke tolerance range and for calculating an adjusting path from the deviation, and d) means for controlling the wear adjusting device as a function of the calculated adjusting path to reestablish the desired application stroke or tolerance range.

12. The device according to claim 11, wherein the sensors include sensors for the path or angle measurement and sensors for the force measurement.

13. The device according to claim 12, wherein the brake application system comprises a force converter for converting energy supplied by a brake actuator to a brake application movement, and the force converter contains a shearing force measuring screw arranged in the flow of force as the sensor for measuring the force.

14. The device according to claim 13, wherein the shearing force measuring screw forms a hinge pin of a hinge mutually connecting at least two force transmission elements of the force converter, at least one strain gauge being held at the circumference of the shearing force measuring screw, which strain gauge generates a corresponding signal acting upon the hinge and being proportional to the just existing braking force.

15. The device according to claim 14, wherein the sensors for the path or angle measurement contain an angle encoder which measures the angle of rotation of a motor driving the brake actuator and modulates a corresponding signal.

16. The device according to claim 1, wherein the means for determining an actual application stroke, the means for comparing the actual application stroke with a desired application stroke or a desired application stroke tolerance range as well as the means for controlling the wear adjusting device are formed by an electronic control and automatic control unit having at least one microcomputer which communicates with the sensors and the wear adjuster.

17. The device according to claim 16, wherein the electrically actuated wear adjusting device has a wear adjuster constructed as a brake actuator, with a screw drive having a threaded spindle as a screw parts and a nut which can be screwed to the threaded spindle, one screw part of the screw drive being electrically driven for the wear adjusting, and the other screw part being electrically driven for the emergency and/or auxiliary release of the brake.

18. A vehicle brake, particularly a rail vehicle brake, having an electrically actuated wear adjusting device of a brake application system, containing a device according to claim 11.

19. A method of controlling an electrically actuated wear adjusting device of a brake application system for vehicles, particularly for rail vehicles comprising:

a) determining an actual application stroke of brake pads from a release position to an application point onto an assigned brake disc or brake drum during a service braking having a covered application path from release to a service braking position as a function of at least one measured application path traveled by the brake pads and a measured braking force value assigned to this covered application path, b) comparing the actual application stroke with a desired application or a desired-application stroke tolerance range and, if the actual application stroke deviates therefrom, computing an adjusting path from the deviation, and c) electronically controlling the wear adjusting device as a function of the computed adjusting path to reestablish the desired application stroke or tolerance range, and wherein, during a service braking which took place at a lower braking force, only the braking force value which occurred for the first time and the assigned covered application path of the brake pads are used for determining the actual application stroke.

20. A method of controlling an electrically actuated wear adjusting device of a brake application system for vehicles, particularly for rail vehicles, comprising:

a) determining an actual application stroke of brake pads from a release position to an application point onto an assigned brake disc or brake drum during a service braking having a covered application path from release to a service braking position as a function of at least one measured application path traveled by the brake pads and a measured braking force value assigned to this covered application path, b) comparing the actual application stroke with a desired application or a desired-application stroke tolerance range and, if the actual application stroke deviates therefrom, computing an adjusting path from the deviation, and c) electronically controlling the wear adjusting device as a function of the computed adjusting path to reestablish the desired application stroke or tolerance range, and wherein, during a service braking which took place at a higher braking force, the braking force value and the respectively assigned covered application path of the brake pads are measured several times successively for determining a braking-force application path course, from which the actual application stroke is extrapolated.

* * * * *